A. S. WARREN.
CABBAGE HARVESTER.
APPLICATION FILED JULY 24, 1913.
1,110,844.
Patented Sept. 15, 1914.
5 SHEETS—SHEET 5.
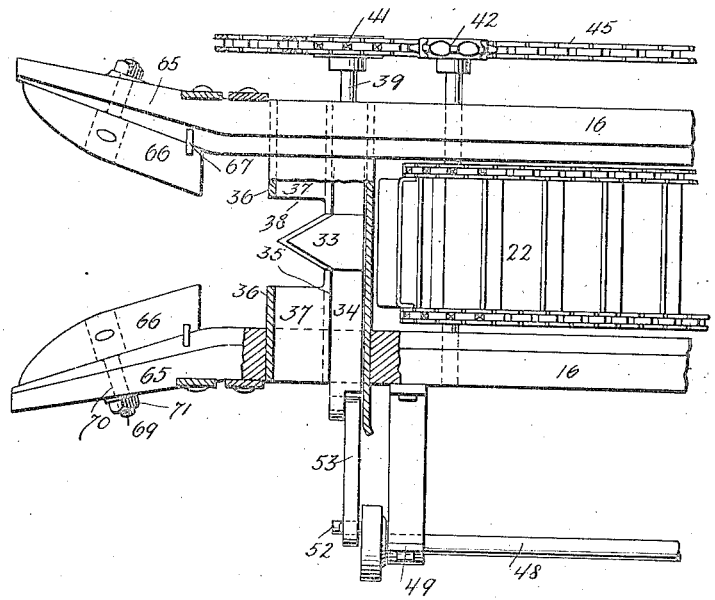
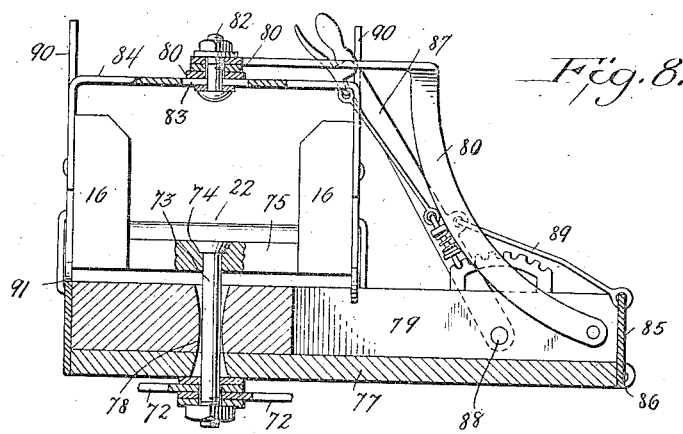
WITNESSES
INVENTOR
ALVA S. WARREN
BY
ATTORNEYS

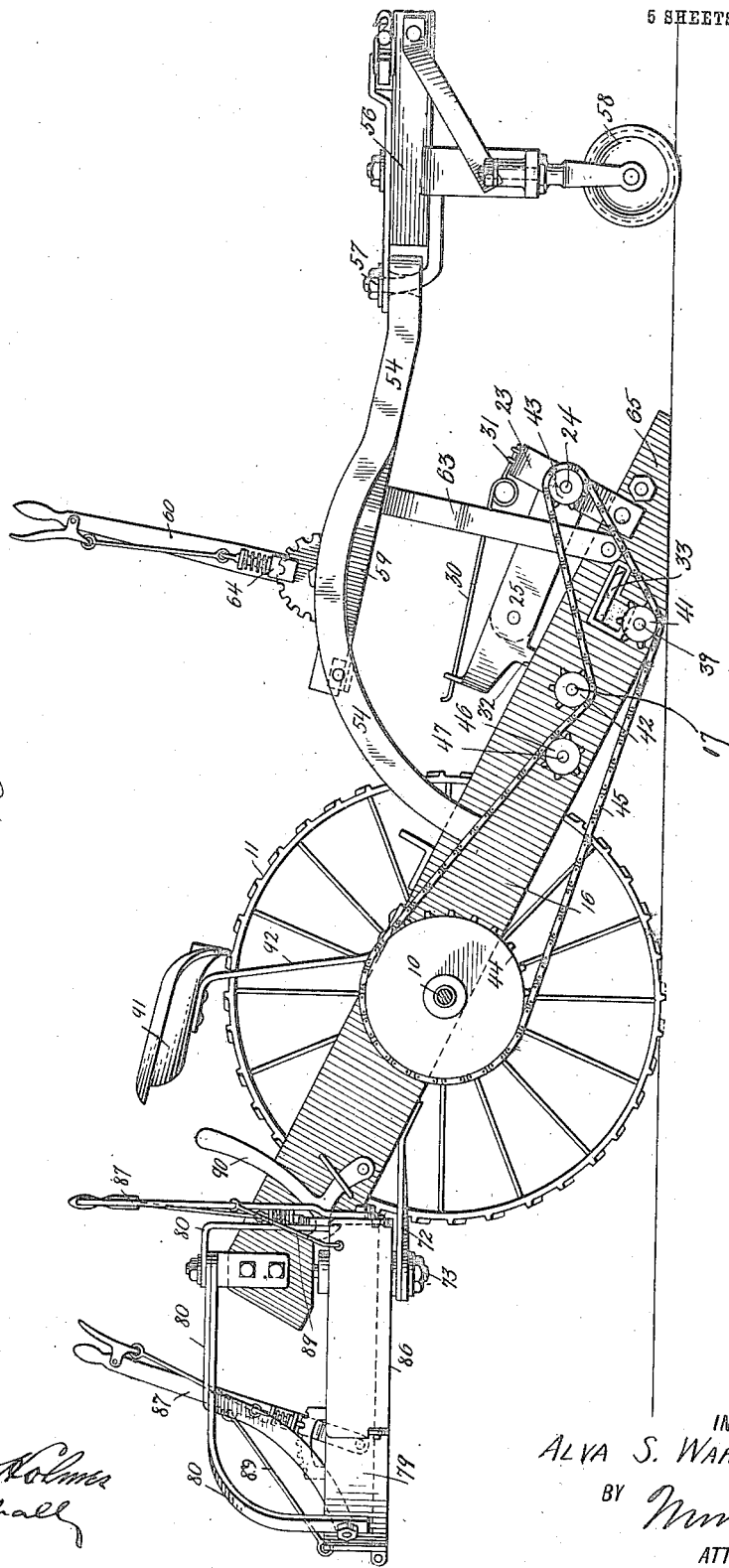

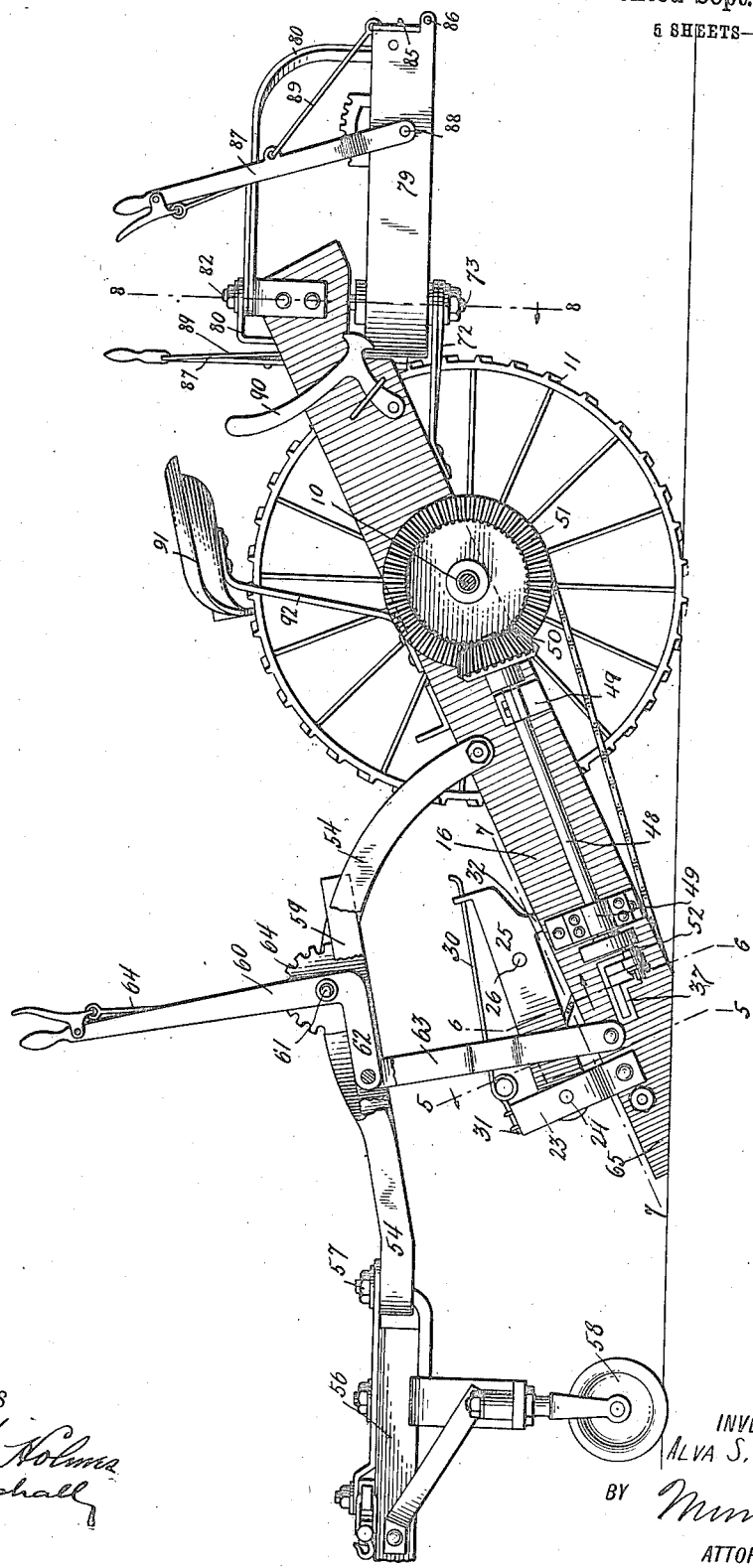

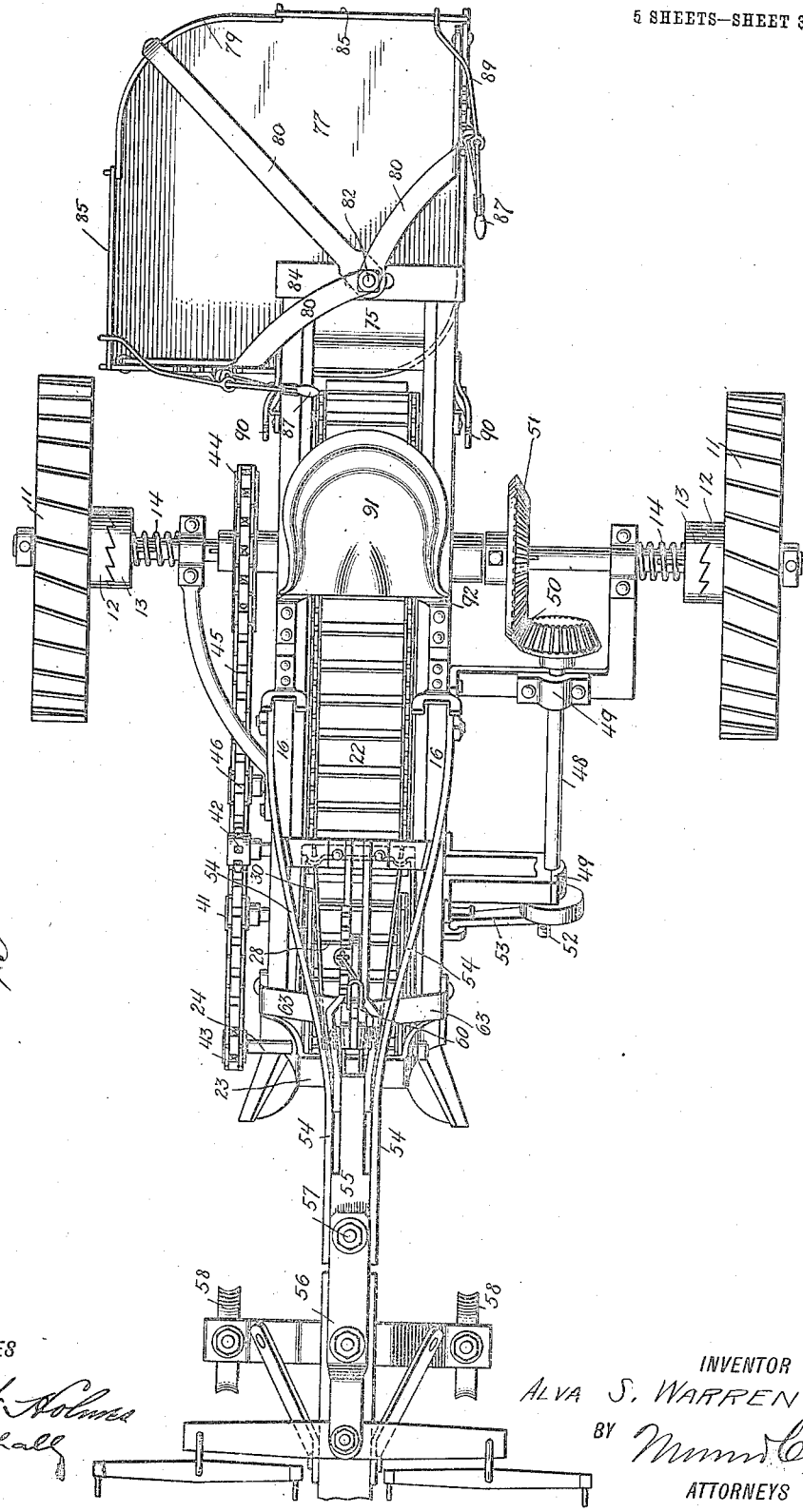

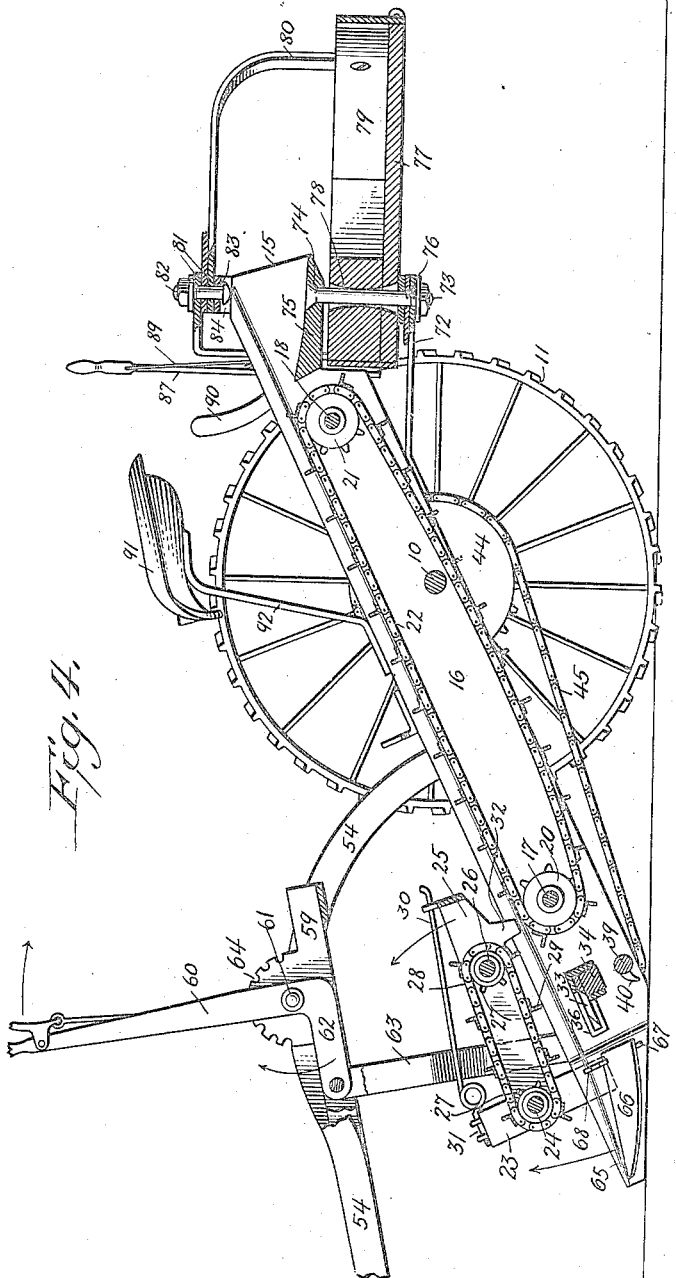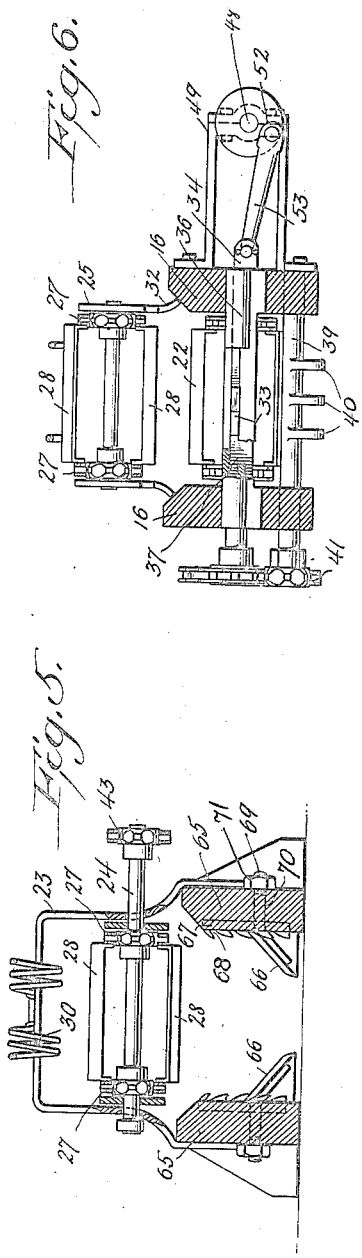

UNITED STATES PATENT OFFICE.

ALVA SMITH WARREN, OF BATAVIA, NEW YORK.

CABBAGE-HARVESTER.

1,110,844.

Specification of Letters Patent. Patented Sept. 15, 1914.

Application filed July 24, 1913. Serial No. 780,977.

*To all whom it may concern:*

Be it known that I, ALVA S. WARREN, a citizen of the United States, and a resident of Batavia, in the county of Genesee and State of New York, have invented a new and Improved Cabbage-Harvester, of which the following is a full, clear, and exact description.

My invention relates to a cabbage harvester and has for its object to provide a presser member movable rearwardly relatively to the frame of the harvester for holding the cabbages down to be cut by the knife, this member also serving to push the cabbages on to an elevator or conveyer. Means are provided for holding the member yieldingly down and for moving the member rearwardly at the same rate of speed that the frame moves forwardly, so that the cabbages will not be turned over should they be pulled up.

Another object of the invention is to provide a rotary shaft with one or more knockers for striking the stump as a cabbage is cut therefrom to prevent the stem and roots from choking the mouth of the harvester.

Still other objects of the invention are to provide gathering blades which are adjustable relatively to the frame, a loosely pivoted buncher platform which may be moved on its pivot to discharge the cabbages at either side of the frame, and means for operating the elevator, the presser member, the knife and the knocker shaft.

Additional objects of the invention will appear in the following complete specification, in which the preferred form of the invention is disclosed.

In the drawings similar reference characters refer to similar parts in all the views, in which—

Figure 1 is a side elevation of the invention looking in one direction; Fig. 2 is a side elevation of the invention looking from the other side and with parts broken away to show how the main frame is raised and lowered; Fig. 3 is a plan view of the invention; Fig. 4 is a sectional side elevation, showing the operating mechanism; Fig. 5 is an enlarged sectional view on the line 5—5 of Fig. 2; Fig. 6 is an enlarged sectional view on the line 6—6 of Fig. 2; Fig. 7 is an enlarged sectional plan view, showing the means for operating the knife bar; and Fig. 8 is a sectional view on the line 8—8 of Fig. 2.

By referring to the drawings, it will be seen that an axle 10 is provided on which are mounted supporting wheels 11, the hubs of the wheels 11 having ratchet members 12 for engaging the ratchet members 13 keyed to the axle 10, the ratchet members 13 being held yieldingly in engagement with ratchet members 12 by means of the springs 14. Pivoted to the axle 10 there is a main frame 15, which has side members 16, which are spaced apart and which are connected by conveyer shafts 17 and 18, which are journaled in bearings in the side member 16 of the frame 15. Disposed between the side members 16 and secured to the conveyer shafts 17 and 18, there are sprocket wheels 20 and 21, around which there is disposed a conveyer 22. The main frame 15 is extended at its forward end to form a bracket 23, having bearings, in which a presser shaft 24 is journaled. Mounted for rocking on this presser shaft 24 there is an auxiliary shaft 25 having bearings, in which a presser shaft 26 is journaled. Sprocket wheels 27 are secured to the conveyer shafts 24 and 26, and disposed around the sprocket wheels 27, there is a presser belt 28 having projections 29. The auxiliary frame 25 is held yieldingly down by a spring 30 which is secured to the bracket 23 at 31 and which presses down against the rear of the auxiliary frame 25. The downward movement of the auxiliary frame 25 is limited by the engagement of feet 32 with the side member 16 of the main frame 15.

It will be observed that the presser belt 28 extends rearwardly to the forward end of the conveyer or elevator 22, so that the presser belt may serve to assist the movement of the cabbages on to the conveyer or elevator. Below the presser belt 28, there is disposed a knife 33 movable with a knife bar 34, one of the functions of the presser belt being to hold the cabbage down as its stem is cut by the knife 33. As will hereafter be described, the bottom of this presser belt 28 moves rearwardly at the same rate of speed that the main frame of the harvester moves forwardly, so that the presser belt will not only hold the cabbage down when its stem is cut by the knife 33, but the head of the cabbage will be prevented from moving laterally relatively to the stem and the ground. The knife bar 34 is disposed for moving horizontally and in a guideway 35 and this guideway 35, has forwardly projecting portions 36 with openings 37, in which the knife 33 travels, the forwardly projecting portions 36, being cut away at 38, so that the knife 33 may cut the cabbage stem when the cabbage stem is disposed between these projections 36.

Disposed below the knife bar 34 there is a knocker shaft 39, which is journaled in bearings in the side member 16 of the main frame 15, this knocker shaft 39, having knockers 40 for striking the stumps or stems of the cabbages as the cabbages are cut therefrom, to hold the stumps or stems down and prevent them with their roots from clogging the throat and operating parts of the harvester. The knocker shaft 39, the presser shaft 24 and the conveyer shaft 17 project beyond one of the side members 16 of the main frame 15, and to the projecting end of the knocker shaft 39, there is secured a sprocket wheel 41, to the projecting end of the conveyer shaft 17, there is secured a sprocket wheel 42 and to the projecting end of the conveyer shaft 24, there is secured a sprocket wheel 43. To the axle 10 there is secured a sprocket wheel 44, a sprocket chain 45 being disposed around the sprocket wheel 44 and the sprocket wheels 42, 41 and 43. An additional sprocket wheel 46 is mounted for rotating on a stud 47 for taking up the slack and holding the sprocket chain 45 tight against the other sprocket wheels. The stud 47 is secured to the side member 16 of the main frame 15. By these means which have been described, the knocker shaft 39 with its knocker 40 is rotated, the presser belt 28 is moved around the shafts 24 and 26 with the lower portion of the presser belt moving rearwardly to engage cabbage heads and the conveyer or elevator 22 is operated. The knife bar 34 with its knife 33 is operated from the other side of the harvester, a shaft 48 being disposed longitudinally of the harvester and journaled in bearings 49, secured to a side member 16 of the main frame 15, a beveled gear 50 being secured to the shaft 48, with which meshes a beveled gear 51 secured to the axle 10. To the forward end of the shaft 48, there is secured a crank 52. This crank 52 is connected with the knife bar 34 by means of a link 53, the rotation of the shaft 48 reciprocating the knife bar 34 in a manner readily understood.

Pivoted to the side members 16 of the main frame 15, there are arms 54 which extend upwardly and forwardly, a member 55 being secured between the forward ends of these arms 54 and a draft member 56 being pivoted to this member 55 at 57 and on a vertical axis. The draft member 56 is provided with supporting wheels 58 which travel on the ground. Secured to and disposed between the arms 54, there are supports 59, a bell crank lever 60 being fulcrumed at 61 to one of these supports 59. The arm 62 of the bell crank lever 60 is connected with the forward end of the main frame 15 by means of a link 63, the customary means 64 being provided for holding the bell crank lever 60 in adjusted position relatively to the supports 59. It will be seen that by means of the bell crank lever 60, the forward end of the main frame 15 may be raised or lowered as desired, so that the knife 33 and the knocker shaft 39 with its knocker 40 will be disposed of as may be desired, relatively to the surface of the ground.

The forward ends 65 of the side members 16 of the main frame 15 diverge forward and disposed at the inner sides of the said forward ends 65, there are guiding blades 66, it being possible to adjust these guiding blades 66 relatively to the forward ends 65 of the side members as may be desired. Secured to the forward ends 65 of the side members, there are vertically disposed members 67 having recesses 68 for receiving the rear edges of the guiding blades 66, the guiding blades being secured to bolts 69 disposed through orifices 70 in the forward ends 65 of the side members, so that the guiding blades 66 may be rotated, with the bolts 69 as their axes, it being possible when the guiding blades 66 have been rotated to the desired positions, to dispose the said edges in the recesses 68, after which the nuts 71 on the bolts 69 may be turned home, to secure the gathering blades in position.

To the rear of the main frame there is secured a bracket 72, a bolt 73 being secured in orifice 74 in the member 75 of the main frame and in an orifice 76 in the bracket 72, there being disposed between the member 75 and the bracket 72, a portion of the platform 77, this platform 77, having an opening 78, in which the bolt 73 is loosely disposed, so that the platform 77 may not only turn from one side of the harvester to the other, but that it may be inclined as may be desired to permit the cabbages which have been deposited on the platform by the conveyer 22, to be moved from the platform. The platform 77 is provided with a rim 79 and to this rim 79 there are secured supports 80 which have orifices 81, through which a bolt 82 is disposed, the bolt 82 also being disposed through a transverse slot 83 in a strap 84, secured to the side members 16 of the main frame 15, the transverse slot 83 permitting the bolt 82 to move laterally, so that the platform 77 may be tilted in the manner described. The platform 77 is adapted to rotate substantially 90 degrees and it is provided with two gates 85 hinged at their lower ends to horizontal axes as at 86, the gates 85 being held normally closed by means of levers 87 pivoted at 88 to the rim 79, the levers 87 being connected with the gates 85 by means of links 89.

Pivoted to the side members 16 of the main frame 15, there are arms 90, with hooks 91 for engaging the rim 79, to hold the platform 77 after it has been rotated to one side of the harvester. The cabbages may be deposited by the gathering blades 77 at certain intervals, so that they will be piled at certain places in the field, or of course if desired the cabbages may be deposited from the platform 77 into a vehicle or receptacle.

The operator of the harvester is provided with a seat 91, which is carried by spring supports 92 secured at their lower ends to the side member 16.

Having thus described my invention, I claim as new and desire to secure by Letters Patent:

1. In a cabbage harvester, a frame movable forwardly, a presser member having a lower portion adapted to move rearwardly for holding down a vegetable to be harvested, harvesting means disposed below and at the rear of the forward portion of the presser member, and means for moving the presser member rearwardly substantially at the same rate of speed that the frame is moved forwardly.

2. In a cabbage harvester, a frame movable forwardly, a knife carried by the frame, a presser member disposed adjacent the knife and means for moving a lower portion of the presser member rearwardly and relatively to the frame substantially at the same rate of speed that the frame is moved forwardly.

3. In a cabbage harvester, a frame, two shafts spaced apart, a presser belt disposed around the shafts for engaging and holding a cabbage in position to be cut, means for rotating one of the shafts for moving a lower portion of the presser belt rearwardly of the frame substantially at the same rate of speed that the frame is moved forwardly, and means adjacent the presser belt for cutting a cabbage.

4. In a cabbage harvester, a main frame movable in one direction, an auxiliary frame pivoted to the main frame, a member movable on the auxiliary frame, resilient means for holding the auxiliary frame downward relatively to the main frame and with the member against a cabbage to be cut, and means for cutting the cabbage.

5. In a cabbage harvester, a frame movably forwardly, two shafts spaced apart, one in front of the other, a presser belt disposed around the shafts for engaging and holding a cabbage in position to be cut, means for cutting the cabbage and means for rotating the forward shaft to move its front portion down and rearwardly substantially at the same rate of speed that the frame is moved forwardly.

6. In a cabbage harvester, a main frame, an auxiliary frame pivoted at its forward end to the main frame, resilient means for holding the auxiliary frame down relatively to the main frame, a member movably mounted on the auxiliary frame, and a horizontal knife movably mounted below the member.

7. In a cabbage harvester, a knife for cutting a cabbage from the stump, and a knocker for striking the stump as the cabbage is cut therefrom.

8. In a cabbage harvester, a knife for cutting a cabbage from the stump, a knocker for striking the stump as the cabbage is cut therefrom, and means for operating the knife and the knocker synchronously.

9. In a cabbage harvester, means for cutting a cabbage from a stump, a shaft disposed below the cutting means, and a knocker on the shaft for striking the stump as the cabbage is cut therefrom.

10. In a cabbage harvester, a frame movable in one direction, two shafts spaced apart, a presser belt disposed around the shafts for engaging and holding a cabbage in position to be cut from its stem, means for rotating one of the shafts for moving the belt relatively to the frame, means disposed below the horizontal plane of the presser belt for cutting the cabbage stem, and a knocker for striking the stem as the cabbage is cut therefrom.

11. In a cabbage harvester, a knife, a presser member disposed above the horizontal plane of the knife for holding down a cabbage to be cut by the knife, a shaft, a knocker thereon for striking the stem of the cabbage as the cabbage is cut therefrom, and means for operating the knife and shafts synchronously.

12. In a cabbage harvester, a knife, a presser member disposed above the horizontal plane of the knife for holding down a cabbage to be cut by the knife, a shaft, a knocker thereon for striking the stem of the cabbage as the cabbage is cut therefrom, and means for operating the knife and shafts synchronously.

13. In a cabbage harvester, a knife, a presser member disposed above the horizontal plane of the knife for holding down a cabbage to be cut by the knife, a shaft, a knocker thereon for striking the stem of the cabbage as the cabbage is cut therefrom, means for operating the knife and shafts synchronously, and guiding blades for directing the cabbage to the presser member.

14. In a cabbage harvester, two frame members spaced apart and having orifices, members with recesses secured to the inner sides of the frame members, guiding blades disposed at the inner sides of the frame members and adjustable in the recesses, and bolts disposed through the orifices for holding the guiding blades in adjusted positions.

15. In a cabbage harvester, a presser member for holding a cabbage in a position to be cut and for assisting the cabbage on a conveyer, a conveyer disposed in the rear of the presser member, means for moving the bottom of the presser member rearwardly at substantially the same rate of speed that the harvester is moved forwardly and means for freeing the cabbage to permit it to be carried by the conveyer.

16. A cabbage harvester for holding a cabbage down while its stem is cut having a presser member for pressing down on the cabbage head and a knife for cutting the stem of the cabbage while the head of the cabbage is so engaged by the presser member.

17. In a cabbage harvester, a conveyer, a presser belt disposed in front of and above the horizontal plane at the front of the conveyer, means for moving the bottom of the belt in the direction of the conveyer, means for cutting the cabbage as it is held in position by the presser belt, and a knocker for striking the cabbage stump as the cabbage is cut therefrom.

18. In a cabbage harvester, a conveyer, a presser belt disposed in front of and above the horizontal plane at the front of the conveyer, means for moving the bottom of the belt in the direction of the conveyer, means for cutting the cabbage as it is held in position by the presser belt, and resilient means for holding the presser belt down.

19. In a cabbage harvester, a main frame, an axle for the main frame, supporting wheels mounted on the axle with means for rotating the axle, a shaft disposed longitudinally of the main frame, gearing connecting the axle with the shafts for rotating the latter, a crank secured to the shaft, a knife bar for moving relatively to the frame, a link connecting the knife bar with the crank for operating the knife bar, a sprocket wheel secured to the axle, a conveyer shaft journaled in bearings in the main frame, a conveyer operable by the shaft, a shaft having a knocker journaled in bearings in the main frame and adjacent the knife bar, a presser shaft journaled in bearings in a member of the main frame, a presser member movable around with the presser shaft, sprocket wheels secured to the second, third and fourth mentioned shafts, and a sprocket chain disposed around the sprocket wheels.

20. In a cabbage harvester, a main frame, an axle for the main frame, supporting wheels mounted on the axle with means for rotating the axle, a shaft disposed longitudinally of the main frame, gearing connecting the axle with the shafts for rotating the latter, a crank secured to the shaft, a knife bar for moving relatively to the frame, a link connecting the knife bar with the crank for operating the knife bar, a sprocket wheel secured to the axle, a conveyer shaft journaled in bearings in the main frame, a conveyer operable by the shaft, a shaft having a knocker journaled in bearings in the main frame adjacent the knife bar, a presser shaft journaled in bearings in the main frame, an auxiliary frame mounted for rocking on the presser shaft, a shaft journaled in the auxiliary frame, a presser belt disposed around the last two mentioned shafts, resilient means for holding the auxiliary frame down, sprocket wheels secured to the second, third and fourth mentioned shafts, and a sprocket chain disposed around the sprocket wheels.

21. A cabbage harvester for pressing down on a cabbage head while its stem is cut having a presser member for pressing down on the cabbage head, means for holding the presser member adjacent the cabbage substantially at the cabbage while the body of the cabbage harvester moves forwardly, and a knife for cutting the cabbage head while the cabbage head is being held as set forth.

22. In a cabbage harvester, a main frame, an axle for the main frame, supporting wheels mounted on the axle with means for rotating the axle, a shaft disposed longitudinally of the main frame, gearing connecting the axle with the shafts for rotating the latter, a crank secured to the shaft, a knife bar for moving relatively to the frame, a link connecting the knife bar with the crank for operating the knife bar, a sprocket wheel secured to the axle, a conveyer shaft journaled in bearings in the main frame, a conveyer operable by the shaft, a shaft having a knocker journaled in bearings in the main frame and adjacent the knife bar, a presser shaft journaled in bearings in a member of the main frame, a presser member for moving around with the presser shaft, sprocket wheels secured to the second, third and fourth mentioned shafts, a platform pivoted to the main frame on a vertical axis and at the rear of the conveyer, a rim for the platform with two outlet openings, doors pivoted on horizontal axes for closing the openings, levers pivoted to the platform, links connecting the levers with the doors, and means for holding the platform in adjusted position.

23. In a cabbage harvester, a frame, a platform pivoted to the frame, means to limit the rotary movement of the platform on the pivot, a rim for the platform and having two openings, doors hinged on horizontal axes for closing the openings, levers pivoted to the platform, links connecting the levers with the doors, and arms pivoted to the frame and provided with hooks for engaging the frame for holding the platform relatively to the frame.

In testimony whereof I have signed my name to this specification in the presence of two subscribing witnesses.

ALVA SMITH WARREN.

Witnesses:
 JOHN M. DAVY,
 JOHN S. GLEASON.